United States Patent Office 2,845,421
Patented July 29, 1958

2,845,421

FLUORINATION OF CHLORO TRIAZINES WITH ANTIMONY TRIFLUORIDE

Christoph J. Grundmann and Ehrenfried H. Kober, Columbus, Ohio, assignors to Olin Mathieson Chemical Corporation, a corporation of Virginia No Drawing. Application September 12, 1956
Serial No. 609,348

8 Claims. (Cl. 260—248)

Our invention relates to a method whereby nuclear chlorine atoms of certain types of chemical compounds can be replaced by fluorine atoms.

It is known to substitute chlorine by fluorine in organic compounds by means of antimony trifluoride or pentafluoride. Preferably a mixture of antimony trifluoride with a catalytic amount of antimony pentachloride or bromide is used. The use of this type of reagent, however, is limited to only certain types of organic chlorine compounds. Only polychloro compounds bearing at least two chloro atoms at the same carbon atoms react, for instance the groups —$CCl_3$, —$CHCl_2$ and —$CCl_2$—. Groups like —$CH_2Cl$ or —CHCl— or

are not attacked by the above described reagents.

We have now surprisingly found that single chlorine atoms attached to a carbon atom can be replaced by fluorine, if this carbon atom is part of a 1,3,5-triazine ring system. The chlorinated triazines can contain one, two or three chlorine atoms attached to the triazine ring. If only one or two substituents are chlorine, the others can be hydrogen, alkyl or aryl groups. Such alkyl or aryl groups can also be substituted by halogens, like fluorine, chlorine, bromine or iodine. Hence, our invention includes a process for the replacement by fluorine of nuclear chlorine atoms of compounds of the class:

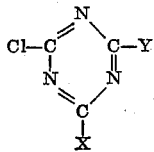

wherein X and Y are chlorine, hydrogen, alkyl radicals preferably containing from 1 to 4 carbon atoms, haloalkyl radicals preferably containing from 1 to 4 carbon atoms, aryl radicals preferably containing not more than 10 carbon atoms and haloaryl radicals preferably containing not more than 10 carbon atoms. Thus, for example, X and Y can be methyl, ethyl, n-propyl, isopropyl, n-butyl, monochloromethyl, dichloromethyl, trichloromethyl, alphachloroethyl, betachloroethyl, phenyl, benzyl, orthotolyl, metatolyl, paratolyl, xylyl, ethylphenyl, cumyl, pseudocumyl, orthochlorophenyl, metachlorophenyl, parachlorophenyl, 2,3-dichlorophenyl, 2,4-dichlorophenyl, 2,5-dichlorophenyl, and so forth. Suitable starting materials for our invention are for instance, 2,4,6-trichloro-1,3,5-triazine (cyanuric chloride); 2,4-dichloro-1,3,5-triazine; 2-methyl-4,6-dichloro-1,3,5-triazine; 2-phenyl-4,6-dichloro-1,3,5-triazine; 2,4-dimethyl-6-chloro-1,3,5-triazine; 2,4-diphenyl-6-chloro-1,3,5-triazine; 2-trichloromethyl-4,6-dichloro-1,3,5-triazine; 2-dichloromethyl-4,6-dichloro-1,3,5-triazine; 2-chloromethyl-2,4-dichloro-1,3,5-triazine; 2,4-bis-trichloromethyl-6-chloro-1,3,5-triazine; 2,4-bis-pentafluoroethyl-6-chloro-1,3,5-triazine; 2,4-bis-heptafluoropropyl-6-chloro-1,3,5-triazine; 2-dibromomethyl-4,6-dichloro-s-triazine; and 2-di-iodomethyl-4,6-dichloro-1,3,5-triazine.

The substitution of chlorine by fluorine in accordance with our invention is carried out by mixing the nuclear chlorinated s-triazine with antimony trifluoride and warming up the reaction mixture until the reaction starts. This is often indicated by the beginning of boiling under reflux since the fluorine substituted s-triazines always have a remarkably lower boiling point than their chlorine analogs. Sometimes it may be advisable to moderate the reaction by using a solvent or diluent which is not attacked by the reagent, like benzene, 1,2-dichloroethane, 1,2-dichloroethylene, perfluoroheptane or tris-trifluoromethyl-s-triazine. The preferred reaction temperature lies between 60° C. and 200° C., although somewhat higher and somewhat lower temperatures can also be used. The reaction at these temperatures is usually complete within 6 to 36 hours. If the fluorinated s-triazine formed is more volatile than the antimony halogenides, it can be easily separated by distilling it off through a fractionating column. If the fluorotriazine formed is less volatile or a crystalline solid, it can be isolated by extraction with a suitable solvent in which the antimony halides are less soluble, such as ligroine. If the fluoro-s-triazine is sufficiently stable against hydrolysis, isolation can also be achieved by dissolving the whole reaction mixture in water and filtering off the water-insoluble fluorinated s-triazine. By recrystallization from a suitable solvent the desired reaction product can then be separated from the adhering basic antimony salts.

If the chloro-substituted s-triazine starting compound contains, besides the chlorine atoms attached to the s-triazine ring, other halogen atoms which are attackable by the fluorinating reagent, they will be substituted too. So, for example 2-trichloromethyl-4,6-dichloro-1,3,5-triazine will furnish the 2-trifluoromethyl-4,6-difluoro-1,3,5-triazine (perfluoro-2-methyl-s-triazine). Hence, in carrying out our process, a stoichiometric excess of antimony trifluoride should be included in the reaction mixture. In other words, the number of fluorine atoms present in the antimony trifluoride should exceed the number of gram atoms of nuclear chlorine present in the s-triazine starting material plus the number of gram atoms of halogen other than fluorine present in the s-triazine starting material and which are attackable by the antimony trifluoride. Preferably, the antimony trifluoride is utilized in combination with from about 10 percent by weight to about 25 percent by weight of antimony trichloride and from about 10 percent by weight to about 25 percent by weight of chlorine, based upon the weight of the antimony trifluoride. Other fluoro substituted triazines which are accessible by our invention are, for instance, 2,4,6-trifluoro-1,3,5-triazine; 2,4-bis-trifluoromethyl-6-fluoro-1,3,5-triazine; 2,4-bis-pentafluoroethyl-6-fluoro-1,3,5-triazine; 2,4-bis-fluoropropyl-6-fluoro-1,3,5-triazine; 2 - methyl - 4,6 -difluoro-1,3,5-triazine; 2-phenyl-4,6-difluoro-1,3,5-triazine; 2,4-diphenyl-6-fluoro-1,3,5-triazine; 2-chloromethyl - 4,6 - difluoro-1,3,5-triazine; and 2-difluoromethyl-4,6-difluoro-1,3,5-triazine.

The fluorinated s-triazines, especially those which do not contain any hydrogen in the molecule, have an unusual thermal stability. They are also very resistant against oxidative or reductive degradation. These properties make these compounds valuable as heat transfer media, coolants, and moderators.

Our invention is further illustrated, but not limited by the following examples.

Example I

*2,4,6-trifluoro-1,3,5-triazine (cyanuric fluoride).*—To a fluorination mixture of 265.5 grams of antimony trifluoride, 35 grams of antimony trichloride and 34 grams of chlorine preheated to 160–180° C., 160 grams of cyanuric chloride was added in small portions. Soon the reaction mixture began to reflux. After 36 hours at 160–180° C. the formed trifluoro-s-triazine was distilled through a Widmer column. The product which boiled between 72 and 80° C. amounted to 105.8 grams corresponding to a yield of 91% of the theory. After two more rectifications the 2,4,6-trifluoro-1,3,5-triazine boiled at 70–72° C. It is a clear, volatile liquid with an unpleasant pungent odor.

Calcd. for $C_3F_3N_3$: C, 26.68; F, 42.20; N, 31.12. Found: C, 26.52, 26.50; F, 42.49, 42.26; N, 31.24, 31.30.

Example II

*2 - trifluoromethyl - 2,4-difluoro - 1,3,5 - triazine.*—To a fluorination mixture consisting of 127 grams of antimony trifluoride, 16.8 grams of antimony trichloride, and 17 grams of cholrine 66.6 grams of 2-trichloromethyl-4,6-dichloro-1,3,5-triazine was added in small portions while heating just enough to cause gentle refluxing. After all the starting material had been added, the reaction mixture was refluxed for 24 hours. Then the formed 2-trifluoromethyl-4,6-difluoro-1,3,5-triazine was distilled off through a fractionating column. The cut boiling between 80.5 and 82° C. amounted to 33.5 grams which equals a yield of 73 percent of theory. After repeated fractionation through a Widmer column the pure product boils at 76–78° C. The perfluorinated triazine has a very aggressive and pungent odor resembling to some extent phosphorus oxychloride.

Calcd. for $C_4F_5N_3$: C, 25.96; F, 51.33; N, 22.71. Found: C, 26.12, 26.33; F, 51.52, 51.43; N, 22.61, 22.81.

The starting material for the above described reaction, 2-trichloromethyl-4,6-dichloro-1,3,5-triazine, is obtained in the following way:

60 grams of 2-methyl-4,6-dichloro-1,3,5-triazine was treated with chlorine between 160 and 180° C. while irradiated with ultraviolet light for a period of 48 hours. After cooling, the dark reaction product was extracted with ligroine (B. P. 90–98° C.) which separated the desired product from dark insoluble resins. The solvent was removed in vacuo and the solid residue sublimed at 1 mm. of mercury pressure and about 110° C. bath temperature. The sublimate obtained consisted of white needles of 2-trichloromethyl-4,6-dichloro-1,3,5-triazine, M. P. 119–121° C. Yield: 33.3% of the theory.

Calcd. for $C_4Cl_5N_3$: C, 17.97; Cl, 66.31; N, 15.72. Found: C, 18.20; Cl, 65.74; N, 15.50.

Example III

*2,4 - bis - trifluoromethyl-6-fluoro-1,3,5-triazine.*—To a fluorination mixture consisting of 254 grams of antimony trifluoride, 33.6 grams of antimony trichloride, and 34 grams of chlorine, 110 grams of 2,4-bis-trichloromethyl-6-chloro-1,3,5-triazine was added in small portions while the reaction mixture was allowed to reflux gently. After all the chlorinated triazine had been added, the reaction mixture was refluxed for 15 hours (bath temperature 160–180° C.). Then 56.5 grams (corresponding to 78.6% of the theory) of the 2,4-bis-trifluoromethyl-6-fluoro-1,3,5-triazine was distilled off through a Widmer column, taking the cut which boiled between 84 and 88° C. After one more fractionation the pure perfluorotriazine boiled at 82–83° C.

Calcd. for $C_5F_7N_3$: C, 25.54; F, 56.58; N, 17.88. Found: C, 25.51, 25.54; F, 56.56, 56.88; N, 17.83, 17.94.

Example IV

*2,4 - diphenyl - 6 - fluoro - 1,3,5 - triazine.*—To a fluorination mixture of 13.3 grams of antimony trifluoride, 1.75 grams of antimony trichloride, and 1.7 grams of chlorine preheated to 180° C., 36 grams of 2,4-diphenyl-6-chloro-1,3,5-triazine was added portionwise. The mixture was kept for 10 hours between 160 and 180° C. After cooling, the solid cake was pulverized and digested with ice and water (100 milliliters). The paste was then filtered by suction, washed with a little water and the filter cake was extracted two times with 100 and 150 milliliters of ligroine (B. P. 90–98° C.). The combined extracts were chilled for 12 hours to 0° C., whereby a by-product (4.5 grams) separated. The ligroine filtrate from this product was evaporated, leaving 27 grams of 2,4 - diphenyl - 6 - fluoro - 1,3,5-triazine as white needles. Yield: 80 percent of the theory. For further purification the product can be recrystallized from a little ligroine or preferably cold acetone and water; melting point 108–109.5° C.

Calcd. for $C_{15}H_{10}FN_3$: C, 71.70; H, 4.01; F, 7.56; N, 16.72. Found: C, 71.77; H, 4.04; F, 7.42; N, 16.68.

Example V

*2 - phenyl - 4,6 - difluoro - 1,3,5 - triazine.*—79.3 grams of 2 - phenyl - 4,6 - dichloro - 1,3,5 - triazine was fluorinated as described in previous examples with a mixture of 60 grams of antimony trifluoride, 8 grams of antimony trichloride and 11 grams of chlorine. The reacted product was isolated analogously. The 2-phenyl-4,6 - difluoro - 1,3,5 - triazine was obtained by repeated recrystallization from ligroine in the form of white needles melting at 98.5–99.5° C. Yield: 73 percent of the theory.

Calcd. for $C_9H_5F_2N_3$: C, 55.97; H, 2.61; N, 21.76. Found: C, 55.15; H, 2.21; N, 21.48.

We claim:

1. A method for producing fluorinated 1,3,5-triazine compounds by replacement with fluorine of nuclear chlorine atoms of a compound of the class:

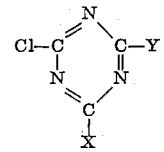

which comprises reacting a compound of said class with a stoichiometric excess of antimony trifluoride at a temperature within the range from 60° C. to 200° C., X and Y being selected from the group consisting of chlorine, hydrogen, alkyl radicals containing from one to four carbon atoms, haloalkyl radicals containing from one to four carbon atoms, aryl radicals containing not more than ten carbon atoms and haloaryl radicals contining not more than ten carbon atoms.

2. The method of claim 1 wherein said compound is cyanuric chloride.

3. The method of claim 1 wherein said compound is 2 - trichloromethyl - 4,6 - dichloro - 1,3,5 - triazine.

4. The method of claim 1 wherein said compound is 2,4 - bis-trichloromethyl - 6 - chloro - 1,3,5 - triazine.

5. The method of claim 1 wherein said compound is 2,4-diphenyl-6-chloro-1,3,5-triazine.

6. The method of claim 1 wherein said compound is 2-phenyl-4,6-dichloro-1,3,5-triazine.

7. The method of claim 1 wherein from about 10 percent by weight to about 25 percent by weight of antimony trichloride and from about 10 percent by weight to about 25 percent by weight of chlorine are introduced into the reaction mixture, based upon the weight of the antimony trifluoride.

8. The method of claim 1 wherein all nuclear chlorine atoms of said compound are replaced by fluorine.

References Cited in the file of this patent

Norton: Journ. Am. Chem. Soc., vol. 72, pp. 3527–81 (1950).

McBee et al.: Industrial and Engineering Chem., vol. 39, No. 3, pp. 415–416.